United States Patent
Masuzawa et al.

(10) Patent No.: US 10,069,433 B2
(45) Date of Patent: Sep. 4, 2018

(54) POWER CONVERTER

(71) Applicant: DENSO CORPORATION, Kariya, Aichi-pref. (JP)

(72) Inventors: Takashi Masuzawa, Kariya (JP); Hiroshi Taki, Kariya (JP)

(73) Assignee: DENSO CORPORATION, Kariya (JP)

(*) Notice: Subject to any disclaimer, the term of this patent is extended or adjusted under 35 U.S.C. 154(b) by 167 days.

(21) Appl. No.: 15/062,533

(22) Filed: Mar. 7, 2016

(65) Prior Publication Data
US 2016/0261181 A1 Sep. 8, 2016

(30) Foreign Application Priority Data
Mar. 6, 2015 (JP) .................. 2015-045234

(51) Int. Cl.
H01F 17/04 (2006.01)
H01F 27/30 (2006.01)
H01F 27/28 (2006.01)
H02M 7/00 (2006.01)

(52) U.S. Cl.
CPC .................. H02M 7/003 (2013.01)

(58) Field of Classification Search
USPC ........................................... 336/208
See application file for complete search history.

(56) References Cited

U.S. PATENT DOCUMENTS

| | | | | |
|---|---|---|---|---|
| 4,866,573 A * | 9/1989 | Bernstein | .................. | H01F 5/04 29/605 |
| 5,325,046 A * | 6/1994 | Young | .................. | G05F 1/32 323/356 |
| 6,633,219 B2 * | 10/2003 | Marbach | .................. | H01F 17/02 336/177 |
| 7,081,804 B2 * | 7/2006 | Kitagawa | .............. | H01F 17/045 336/200 |
| 2004/0075515 A1 * | 4/2004 | Kyogoku | ................ | H01F 17/02 336/12 |
| 2012/0133473 A1 * | 5/2012 | Shih | ...................... | H01F 17/062 336/200 |

(Continued)

FOREIGN PATENT DOCUMENTS

| JP | 2005-037347 A | 2/2005 |
|---|---|---|
| JP | 2005-250214 A | 9/2005 |

OTHER PUBLICATIONS

Shuo Wang et al; "Effects of parasitic parameters on EMI filter performance;" IEEE Transactions on Power Electronics; May 2004; vol. 19; No. 3; pp. 826-875.

*Primary Examiner* — Ronald Hinson
(74) *Attorney, Agent, or Firm* — Oliff PLC (57) ABSTRACT

A power converter is provided which includes at least a first and a second magnetic device equipped with coils and an electrical circuit equipped with a conductor disposed on an imaginary plane, defined between the first and second magnetic devices. Magnetic fluxes are emitted from the coils of the first and second magnetic devices, vectors of components which are oriented in directions of axes of turns of conductors of the coils are defined as a first and a second vector, and the first and second magnetic devices are disposed so that an inner product of vectors derived by projecting the first and second vectors on the imaginary plane will be positive. This minimizes electrical noise generated in the electrical circuit.

8 Claims, 6 Drawing Sheets

(56) References Cited

U.S. PATENT DOCUMENTS

| | | | |
|---|---|---|---|
| 2012/0307413 A1* | 12/2012 | Masuzawa | F02P 3/0453 361/263 |
| 2013/0038418 A1* | 2/2013 | Yang | H01F 5/00 336/200 |
| 2015/0042235 A1 | 2/2015 | Yasuzumi et al. | |

* cited by examiner

POWER CONVERTER

CROSS REFERENCE TO RELATED DOCUMENT

The present application claims the benefit of priority of Japanese Patent Application No. 2015-45234 filed on Mar. 6, 2015, the disclosure of which. is incorporated herein by reference,

BACKGROUND

1. Technical Field

This application relates generally to a power converter equipped with a magnetic device.

2. Background Art

Some power conversion devices such as inverters or converters mounted in electric vehicles or hybrid vehicles are equipped with a magnetic device such as a reactor, a transformer, or a choke coil. The action of magnetic flux, as produced by the magnetic device, on parts of the power conversion device (i.e., magnetic coupling between them) will adversely affect anti-noise performance of a power conversion circuit. For example, Effects of Parasitic Parameters on EMI Filter Performance, written by Shuo, Wang, Fred, C. Lee, Dan Y. Chen, and other members, published by IEEE Trans. on power electronics, Vol. 19, No. 3, May, 2004 discloses techniques of changing orientation of a magnetic device or magnetically shieling the magnetic device.

The techniques, as taught in the above document, however, encounter a difficulty in avoiding the action of the magnetic flux on an electric circuit such as a control circuit board, which will increase the risk of generation of electric noise from the electric circuit.

SUMMARY

It is therefore an object of this disclosure to provide a power converter which is capable of minimizing electric noise generated from an electric circuit installed in the power converter.

According to one aspect of an embodiment, there is provided a power converter which may be employed in automotive vehicles such as electric cars or hybrid cars, The power converter comprises: (a) a first and a second magnetic device each of which is equipped with a coil; and (b) an electrical circuit which includes a conductor located on an imaginary plane, as defined between the first and second magnetic devices.

Magnetic fluxes are emitted from the coils of the first and second magnetic devices, vectors of components which are oriented substantially in directions of axes of turns of conductors of the coils are defined as a first and a second vector, and the first and second magnetic devices are disposed so that an inner product of vectors derived by projecting the first and second vectors on the imaginary plane will be positive.

The power converter is, as described above, designed to have the magnetic devices arranged so that the inner product of the first and second vectors will be positive. This causes components of the magnetic fluxes, as emitted from the first and second magnetic devices, which interlink with the imaginary plane repel each other in the direction normal to the imaginary plane. In other words, the first and second magnetic devices are disposed to produce the magnetic fluxes whose portions interlink with the imaginary plane and are oriented in opposite directions away from the imaginary plane. This will cause the magnetic fluxes, as emitted from the first and second magnetic devices, not to interlink with the conductor of the electrical circuit which extends along the imaginary plane, thus eliminating the probability of magnetic coupling of the first and second magnetic devices with the electrical circuit to minimize the electrical noise generated in the electrical circuit.

The power converter is, as apparent from the above discussion, capable of minimizing the electrical noise generated from the electrical circuit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

Figure 1:
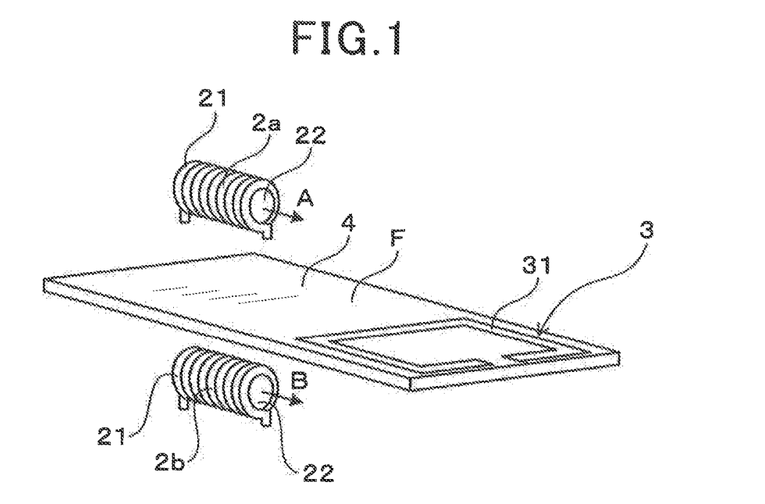
FIG. 1 is a perspective view which partially illustrates a power converter according to the first embodiment.
Figure 2:
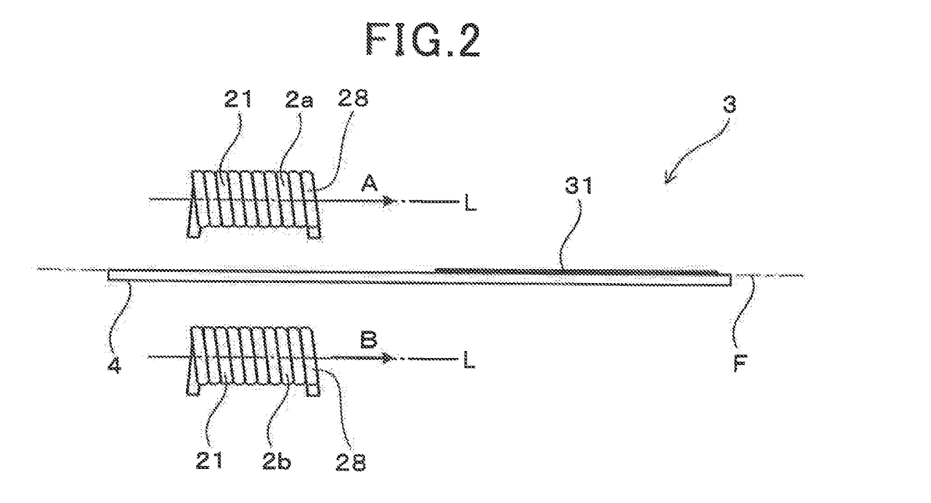
FIG. 2 is a side view of the power converter in FIG. 1.
Figure 3:
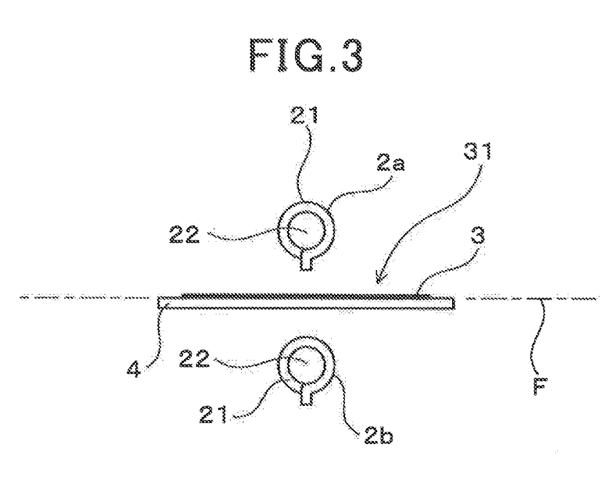
FIG. 3 is a front view which partially illustrates the power converter in FIG. 1.

Referring to the drawings, wherein like reference numbers refer to like parts in several views, particularly to FIGS. 1 to 5, there is shown a power converter according to the first embodiment which may be mounted in automotive vehicles such as electric vehicles or hybrid vehicles. The power converter, as illustrated in FIGS. 1 to 3, includes at least two magnetic devices 2a and 2b equipped with coils 21 and an electrical circuit 3 equipped with a conductor 31 formed on an imaginary plane F disposed between the magnetic devices 2a and 2b.

In the following discussion, of magnetic fluxes emitted from the coils 21 of the magnetic devices 2a and 2b, vectors of components which are oriented in winding axial directions L (i.e., directions in which axes of turns of conductors 28 of the coils 21 extend) are defined as vectors A and B oriented in an axial direction of the magnetic devices 2a and 2b. The vectors A and B extend substantially parallel to the axial direction of the magnetic devices 2a and 2b, but however, need not necessarily be exactly oriented in such a direction. For instance, the vectors A and B may extend within an angular range of ±45°, more preferably of ±35° with respect to the winding axial direction L.

The magnetic devices 2a and 2b are arranged so that an inner product of vectors derived by projecting the vectors A and B on the imaginary plane F will be positive.

The power converter is mounted in, for example, an electrical vehicle or a hybrid vehicle, The power converter, as referred to herein, is implemented by, for example, an inverter which works to convert dc power into ac power required by a drive motor installed in the vehicle, a step-up converter which works to step-up dc power and supply it to an inverter, or a DC-DC converter which works to step-down dc power for use in accessories mounted in the vehicle.

Each of the magnetic devices 2a and 2b may be a reactor, a choke coil, or a transformer, Specifically, each of the magnetic devices 2a and 2b is implemented by a reactor which constitutes a step-up circuit, a choke coil which constitutes a filter circuit, or a transformer used with a DC-DC converter.

Each of the magnetic devices 2a and 2b, as referred to in this embodiment, includes a core 22 made of magnetic material and the coil 21 wound around the core 22 in a spiral form, but is not limited to the same.

Figure 4:
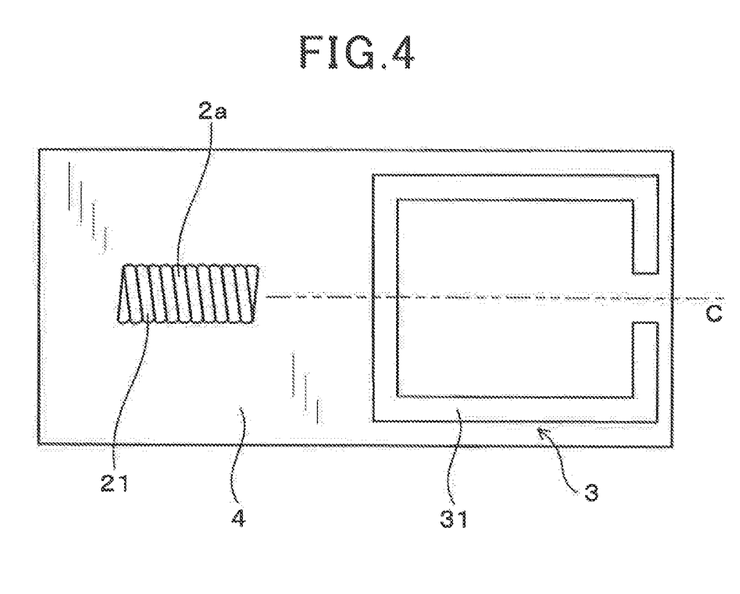
FIG. 4 is a plan view which partially illustrates the power converter in FIG. 1.

When viewed in a direction normal to the imaginary plane F in FIG. 4, the magnetic devices 2a and 2b are laid to at least partially overlap each other. In this embodiment, the magnetic devices 2a and 2b almost overlap each other in the direction normal to the imaginary plane F.

The magnetic devices 2a and 2b are, as illustrated in FIGS. 1 to 3, arranged to be symmetrical with respect to the imaginary plane F. In other words, the magnetic devices 2a and 2b are located to overlap each other in the direction normal to the imaginary plane F and also arranged at the same distance away from the imaginary plane F in the direction normal to the imaginary plane F.

The magnetic devices 2a and 2b are also arranged to have the vectors A and B oriented parallel to the imaginary plane F, so that the vectors A and B in the magnetic devices 2a and 2b extend parallel to each other and are oriented in the same direction.

The electrical circuit 3 is fabricated on the printed circuit board 4. The conductor 31 is formed as a wiring pattern printed on the printed circuit board 4. Specifically, the conductor 31 is made of a printed wiring pattern plated on the printed circuit board 4. The electrical circuit 3 includes various types of electronic devices (not shown), such as a capacitor, a resistor, and a semiconductor device, which are electrically connected to the conductor 31. The conductor 31 is, as clearly illustrated in FIGS. 1, 2, and 4, at least partially offset from magnetic devices 2a and 2b in the winding axial direction. When viewed in the direction normal to the imaginary plane F, the magnetic devices 2a and 2b are disposed inside the profile of the outer periphery of the printed circuit board 4. When viewed in the direction normal to the imaginary plane F, a line extending from the winding axis (i.e., the longitudinal center line) of the magnetic devices 2a and 2b intersects with the conductor 31.

The magnetic devices 2a and 2b are of the same type. Specifically, the magnetic devices 2a and 2b are identical in size and configuration with each other and also engineered to have the same magnetic properties. More specifically, the magnetic devices 2a and 2b are equipped with the coils 21 which are identical in number of turns of wire and inductance with each other.

The operation of the power converter of this embodiment and beneficial advantages offered thereby will be described below.

Figure 5:
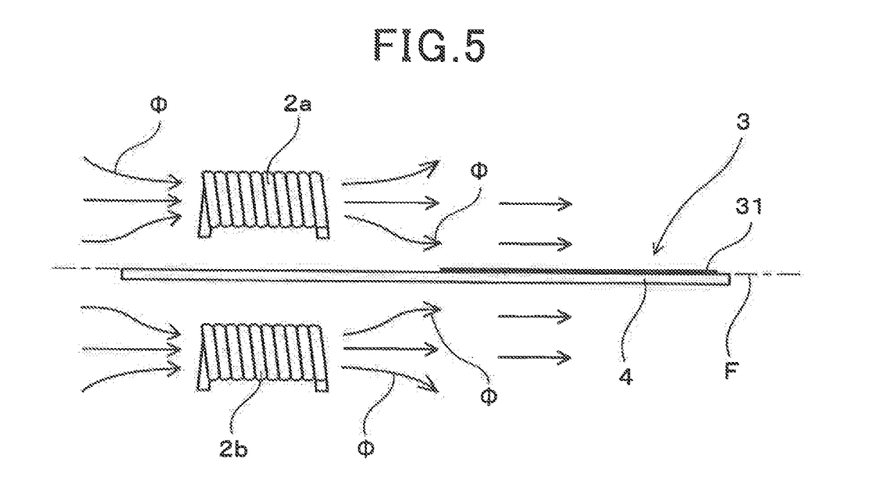
FIG. 5 is a side view which illustrates the power converter of the first embodiment for explaining an operation and beneficial effects thereof.

The power converter is, as described above, designed to have the magnetic devices 2a and 2b arranged so that the inner product of vectors derived by projecting the vectors A and B on the imaginary plane F will be positive. Particularly, the projected vectors are oriented in the same direction and laid to overlap each other. This causes, as illustrated in FIG. 5, portions of the magnetic fluxes, as emitted from the magnetic devices 2a and 2b, which interlink with the imaginary plane F to repel each other in the direction normal to the imaginary plane F.

Figure 6:
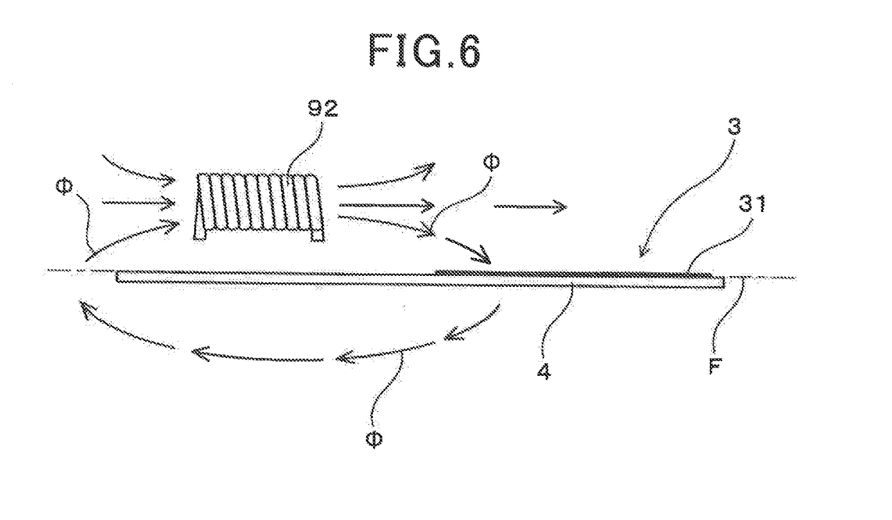
FIG. 6 is a side view which demonstrates how to create magnetic coupling between a magnetic device and an electronic circuit.
Figure 7:
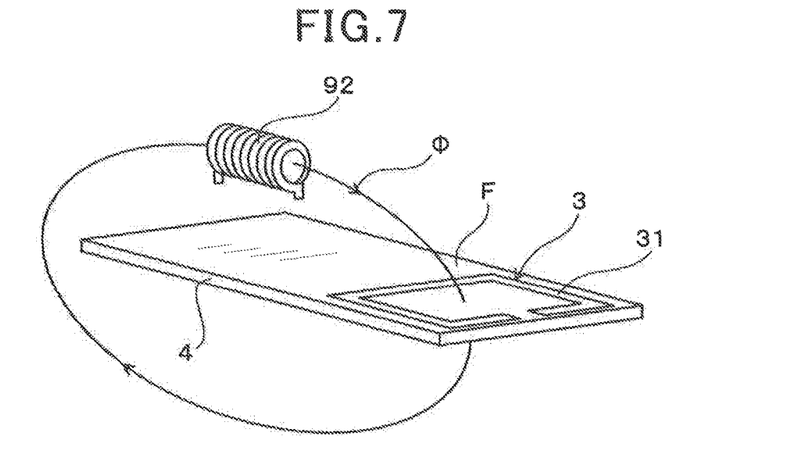
FIG. 7 is a perspective view which demonstrates how to create magnetic coupling between a magnetic device and an electronic circuit.

For a better understanding of the operation of the power converter in this embodiment, consider the case, as illustrated, in FIGS. 6 and 7, where a magnetic device 92 is disposed only in one of two spaces isolated by the imaginary plane F. Such a case corresponds to the case where only the magnetic device 2a is disposed on one of sides of the imaginary plane F.

In the above case, the magnetic flux Φ, as produced by the magnetic device 92, partly interlinks with the conductor 31 extending along the imaginary plane F, in other words, the magnetic device 92 is magnetically coupled with the electronic circuit 3. The magnetic flux Φ emitted from the magnetic device 92 may, therefore, give rise to electrical noise in the electronic circuit 3.

In order to eliminate the above problem, the power converter of this embodiment is engineered to have the two magnetic devices 2a and 2b disposed to produce the magnetic fluxes Φ whose portions interlink with the imaginary plane F and are oriented in opposite directions normal to the imaginary plane F. This will cause, as can be seen in FIG. 5, the magnetic fluxes Φ, as emitted from the magnetic devices 2a and 2b, not to interlink with the conductor 31 of the electrical circuit 3 which extends along the imaginary plane F, thus eliminating the magnetic coupling of the magnetic devices 2a and 2b with the electrical circuit 3 to minimize the electrical noise generated by the electrical circuit 3.

Each of the magnetic devices 2a and 2b in this embodiment is oriented to have a length extending substantially parallel to the imaginary plane F, thus minimizing the probability of the magnetic coupling of the magnetic devices 2a and 2b with the electrical circuit 3.

When viewed in the direction normal to the imaginary plane F, the magnetic devices 2a and 2b are, as described above, laid to at least partially overlap each other, so that the magnetic fluxes Φ, as emitted from the magnetic devices 2a and 2b, have components which are oriented in the direction normal to the imaginary plane F and cancelled by each other. In this embodiment, the magnetic devices 2a and 2b almost entirely overlap each other in the direction normal to the imaginary plane F, thereby facilitating the cancellation of components of the magnetic fluxes Φ which extend in the direction normal to the imaginary plane F.

The magnetic devices 2a and 2b are also arranged to be symmetrical with respect to the imaginary plane F, thereby facilitating the ease with which the magnetic fluxes Φ, as emitted 2b from the components of the magnetic devices 2a and 2b which are oriented in the direction normal to the imaginary plane F cancel each other.

The electrical circuit 3 is fabricated on the printed circuit board 4. The conductor 31 is formed by a wiring pattern printed on the printed circuit board 4, thereby minimizing the electrical noise generated from the electrical circuit 3 on the printed circuit board 4.

The magnetic devices 2a and 2b are, as described above, of the same type, thereby enhancing the ease with which the components of the magnetic fluxes Φ which are oriented in the direction normal to the imaginary plane F cancel each other.

The power converter of this embodiment is, as apparent from the above discussion, capable of minimizing the electrical noise generated from the electrical circuit 3.

Second Embodiment

Figure 8:
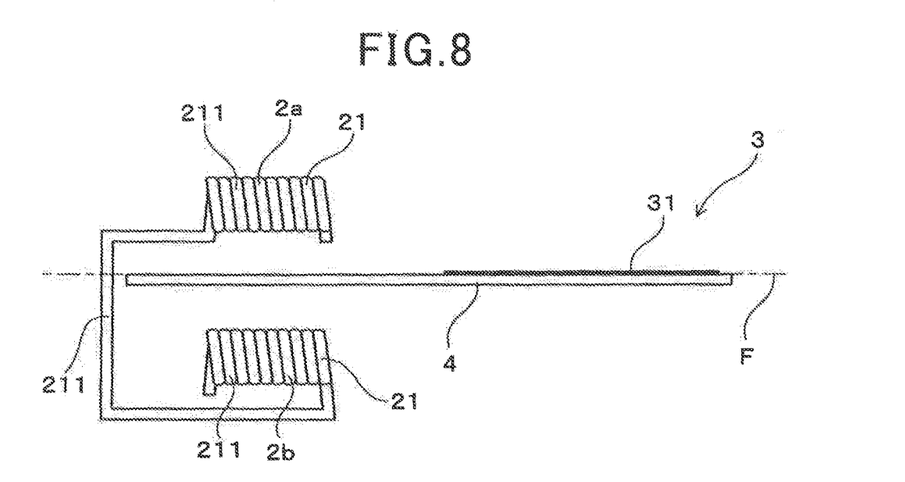
FIG. 8 is a side view which partially illustrates a power converter according to the second embodiment.

A power converter of the second embodiment is, as illustrated in FIG. 8, designed to have the magnetic devices 2a and 2b equipped with the coils 21 which are made of a single conductor 211 (i.e., a single piece of wire). In other words, the coils 21 of the magnetic devices 2a and 2b share the conductor 211 with each other. Other arrangements are identical with those in the first embodiment, and explanation thereof in detail will be omitted here, The same reference numbers, as employed in the first embodiment, will refer to the same parts in embodiments following the first embodiment unless otherwise specified.

The above arrangements of the coils 21 in the second embodiment enable the magnetic devices 2a and 2b to be designed to emit the magnetic fluxes Φ at the same time, which is effective in avoiding the generation of electrical noise in the electrical circuit 3. The other operations and beneficial advantages of the power converter of this embodiment are the same as those in the first embodiment.

Third Embodiment

Figure 9:
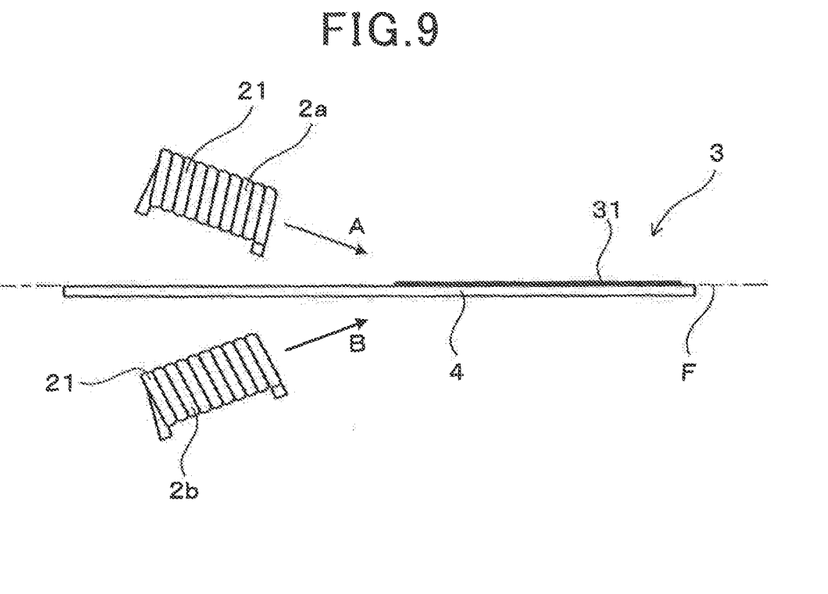
FIG. 9 is a side view which partially illustrates a power converter according to the third embodiment.

A power converter of the third embodiment is, as illustrated in FIG. 9, designed to have the magnetic devices 2a and 2b inclined to have the vectors A and B extending at a given angle other than zero to the imaginary plane F. In other words, each of the magnetic devices 2a and 2b is oriented to have a length inclined at a given angle to the imaginary plane F. The angle which each of the vectors A and B makes with the imaginary plane F is preferably selected to be less than or equal to 45°.

The magnetic devices 2a and 2b of this embodiment are, like in the first embodiment, arranged so that an inner product of vectors derived by projecting the vectors A and B on the imaginary plane F will be positive. The magnetic devices 2a and 2b are also disposed to be mirror image symmetrical with respect to the imaginary plane F. In other words, inclined orientations of the magnetic devices 2a and 2b are directed in opposite directions, Other arrangements are identical with those in the first embodiment.

The power converter of this embodiment is, as apparent from the above discussion, capable of minimizing the electrical noise generated from the electrical circuit 3. The other operations and beneficial advantages of the power converter of this embodiment are the same as those in the first embodiment.

Fourth Embodiment

Figure 10:
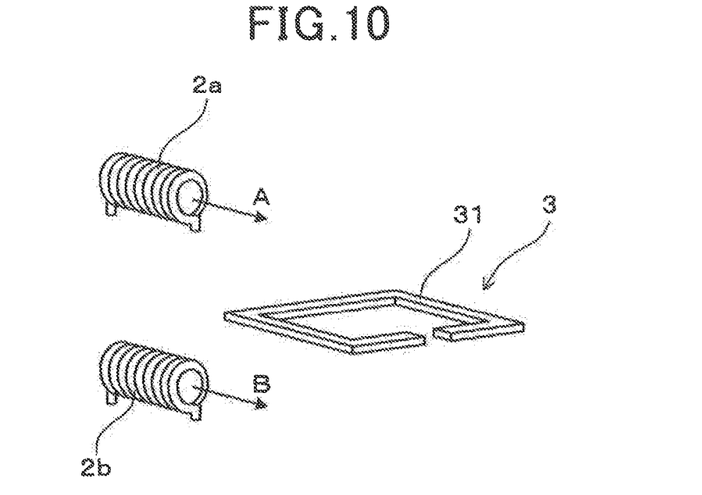
FIG. 10 is a perspective view which partially illustrates a power converter according to the fourth embodiment.

A power converter of the fourth embodiment is, as illustrated in FIG. 10, designed to have the conductor 31 implemented by a bus bar. Specifically, the conductor 31 is made of a metallic bus bar. Electronic devices (not shown) are connected to the conductor 31 to constitute the electronic circuit 3. The positional relation and orientation of the magnetic devices 2a and 2b to an imaginary plane on which the conductor 31 is disposed is identical with those in the first embodiment. The conductor 31 of the fourth embodiment is not formed on the printed circuit board 4 illustrated in FIG. 10

Other arrangements are identical with those in the first embodiment.

The power converter of this embodiment is, like in the first embodiment, capable of minimizing the electrical noise generated from the electrical circuit 3. The other operations and beneficial advantages of the power converter of this embodiment are the same as those in the first embodiment.

Fifth Embodiment

Figure 11:
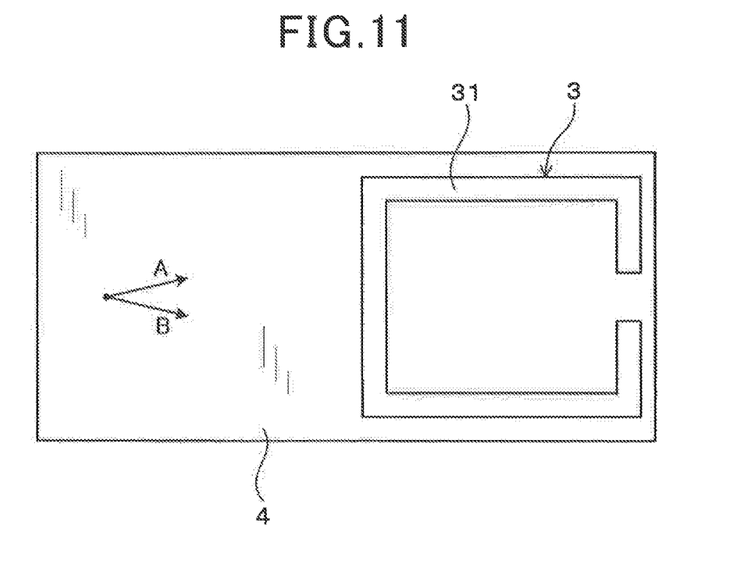
FIG. 11 is a plan view which partially illustrates a power converter according to the fifth embodiment.

A power converter of the fourth embodiment is designed to have the magnetic devices 2a and 2b oriented so that vectors derived by projecting the vectors A and B, as illustrated in FIG. 11, extend non-parallel to each other. Specifically, when viewed in a direction normal to the imaginary plane F, the vectors A and B do not extend parallel to each other.

The magnetic devices 2a and 2b are, like in the first embodiment, arranged so that an inner product of the vectors derived by perpendicularly projecting the vectors A and B on the imaginary plane F will be positive. The angle which each of the vectors A and B makes with the imaginary plane F is preferably selected to be less than or equal to 45°, more preferably less than or equal to 30° (and more than zero). For the sake of simplicity of illustration, FIG. 11 omits the magnetic devices 2a and 2b.

Other arrangements are identical with those in the first embodiment.

The power converter of this embodiment is, like in the first embodiment, capable of minimizing the electrical noise generated from the electrical circuit 3. The other operations and beneficial advantages of the power converter of this embodiment are the same as those in the first embodiment.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

The magnetic devices 2a and 2b are, as described above, arranged so that an inner product of vectors derived by projecting the vectors A and B on the imaginary plane F will be positive and more preferably oriented to be symmetric with respect to the imaginary plane F. The magnetic devices 2a and 2b are also preferably disposed so as to orient the vectors A and B substantially in the same direction and parallel to the imaginary plan F.

What is claimed is:

1. A power converter comprising:
   a first and a second magnetic device each of which is equipped with a coil; and
   an electrical circuit which includes a conductor located on an imaginary plane, as defined between the first and second magnetic devices,
   wherein magnetic fluxes are emitted from the coils of the first and second magnetic devices, vectors of components of the magnetic fluxes, the vectors of the components being oriented substantially in directions of axes of turns of conductors of the coils, are defined as a first and a second vector, and the first and second magnetic devices are disposed so that an inner product of vectors derived by projecting the first and second vectors on the imaginary plane is positive.

2. A power converter as set forth in claim 1, wherein the first and second magnetic devices are arranged to have the first and second vectors extending parallel to the imaginary plane.

3. A power converter as set forth in claim 1, wherein the coils of the first and second magnetic devices are made of a single conductor.

4. A power converter as set forth in claim 1, wherein the conductor of the electrical circuit is implemented by a bus bar.

5. A power converter as set forth in claim 1, wherein the electrical circuit is formed on a printed circuit board, and the conductor of the electrical circuit is made of a wiring pattern printed on the printed circuit board.

6. A power converter as set forth in claim 1, wherein the first and second magnetic devices are of the same type.

7. A power converter as set forth in claim 1, wherein when viewed in a direction normal to the imaginary plane, the first and second magnetic devices are laid to at least partially overlap each other.

8. A power converter as set forth in claim 7, wherein the first and second magnetic device are arranged to be symmetric with respect to the imaginary plane.

* * * * *